United States Patent [19]

Haverstreng

[11] 4,032,489

[45] June 28, 1977

[54] BUTYL GLAZING COMPOSITION

[75] Inventor: Hilmar Haverstreng, Sao Paulo, Brazil

[73] Assignee: USM Corporation, Boston, Mass.

[22] Filed: June 24, 1975

[21] Appl. No.: 589,697

[30] Foreign Application Priority Data

July 4, 1974 Germany ............................ 2432496

[52] U.S. Cl. ............................ 260/27 BB; 156/109; 156/334; 260/829; 260/846; 260/876 B
[51] Int. Cl.² .................. C08L 51/00; C08L 93/00
[58] Field of Search .................. 156/107, 109, 334; 260/27 BB, 876 B, 846, 829; 428/34

[56] References Cited

UNITED STATES PATENTS

| 3,231,419 | 1/1966 | Korpman | 427/207 |
|---|---|---|---|
| 3,239,478 | 3/1966 | Harlan, Jr. | 260/876 B |
| 3,352,944 | 11/1967 | Wheat | 260/27 BB |
| 3,424,836 | 1/1969 | McKelvey et al. | 118/316 |
| 3,625,752 | 12/1971 | Korpman | 260/27 BB |
| 3,660,323 | 5/1972 | Raguse | 260/876 B |
| 3,686,364 | 8/1972 | Robinson et al. | 260/876 B |
| 3,759,771 | 9/1973 | Battersby | 156/109 |
| 3,850,858 | 11/1974 | Park | 260/876 B |
| 3,852,149 | 12/1974 | Sitter et al. | 156/107 |
| 3,870,676 | 3/1975 | Condon | 260/880 B |
| 3,932,328 | 1/1976 | Korpman | 260/27 BB |
| 3,935,893 | 2/1976 | Stang et al. | 260/876 B |
| 3,984,369 | 10/1976 | Harlan, Jr. et al. | 260/27 BB |

*Primary Examiner*—Charles E. Van Horn
*Assistant Examiner*—Michael W. Ball
*Attorney, Agent, or Firm*—Benjamin C. Pollard; Richard B. Megley; Vincent A. White

[57] ABSTRACT

A composition based on butyl rubber resins and filler particularly useful for hot melt application as a sealant for combining a plurality of glass panes in an insulating glazing unit in which improved workability in heated condition is secured without adversely affecting its other properties through inclusion of a minor amount of a thermoplastic block copolymer of polystyrene and polybutadiene or polystyrene and polyisoprene.

4 Claims, 1 Drawing Figure

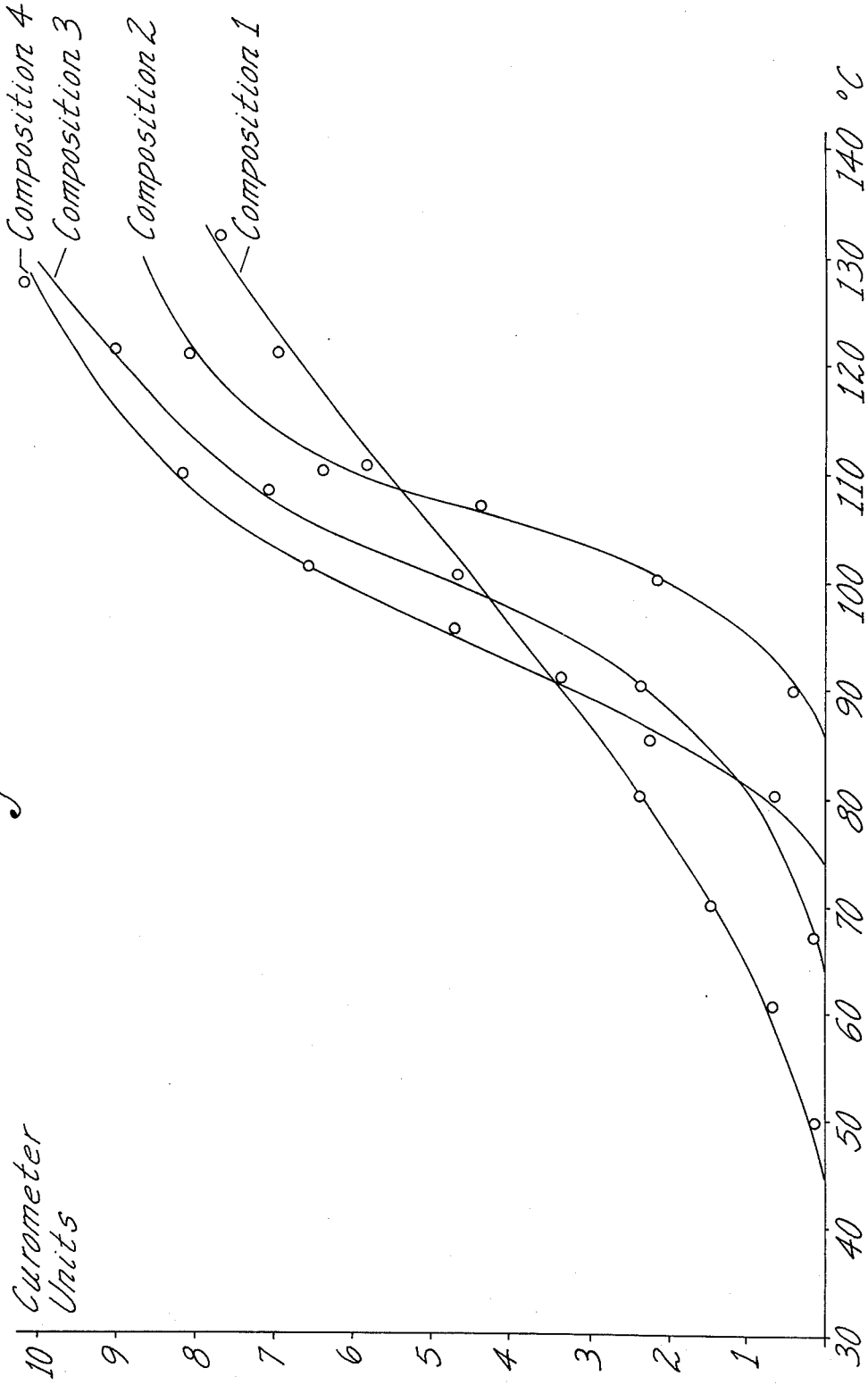

BUTYL GLAZING COMPOSITION

FIELD OF THE INVENTION

This invention relates to hot melt sealants based on butyl rubber particularly useful for glazing.

BACKGROUND OF THE INVENTION

It has been proposed to produce insulating glazing units (e.g. heat insulating double glazing units) by combining two glass panes into one unit by the use of distance-holders, spacing the panes apart at a specified distance from each other, the panes being, for example, adhesively bonded together. Great demands are made on the adhesive used, since it must bond the glass and the distance-holder sufficiently strongly together, and produce a satisfactory seal against diffusion of water-vapour. The adhesive must in addition retain these principal characteristics unchanged over a relatively wide range of temperatures, somewhere in the zone of −30° C. to +40° C. It is also desirable from the viewpoint of the glazing unit producer that this adhesive can be worked as a hot-melt adhesive.

Adhesives based on butyl rubber have been proposed for glazing sealants which exhibit a good sealing capacity against water-vapour diffusion and resistance to cold and heat. A large disadvantage, however, of proposed butyl-rubber based sealant adhesives resides in the fact that they are not readily processable as hot-melt adhesives. Naturally, a series of attempts has been undertaken and made known aiming at modifying butyl-rubber based compositions in such a way that they can be worked in melted condition.

Moreover, as indicated at the outset, a whole series of attempts in the modifying of butyl-rubber based compositions has been made. Thus, it has already been tried to dilute butyl-rubber compositions with relatively large quantities of asphalt or bitumen in order to impart thermoplastic properties. Such mixtures do indeed exhibit an unimpaired, good degree of proof against water-vapour diffusion and good thermoplastic behaviour, but they exhibit unsatisfactory behaviour when heated or cooled. They become very cold-brittle even within the range of hardening temperature, whilst on the other hand they quickly begin to soften when heated. Such mixtures are thus not suitable as sealing adhesive for the production of insulating glazing.

With the addition of other thermoplasts, for example by the addition of hydrocarbon polymers of the styrene type or cumaron-indene type or colophonium, colophonium-derivatives or polyethylene, butyl-rubber based compositions become more satisfactory in the desire way, but at the same time, however, the degree of proof against water-vapour diffusion is perceptibly reduced, especially with polyethylene additions with a high melt-index, and adhesion to glass and the spacer material decreases.

In German Offenlegungsschrift 2140834 a method is disclosed of using, for the production of insulating glazing units, compounds based on thermoplastic rubber block copolymers of the types Styrene/Butadiene/Styrene and Styrene/Isoprene/Styrene. The compounds are said to consist of at least 20% of one of the above-mentioned block polymers, and can contain 0 to 80%, preferably 0 to 50% of a thermoplastic polymer, which may be, among others, polyisobutylene. A disadvantage of these types of compound is that they do not adhere well enough to glass to give adequate water-impermeability. For defect-free processing, adhesive agents must be included which, within the framework of the production of insulating glazing units involves a two-stage working-process, and thereby avoidable expense. Apart from that, compositions of the kind described in Offenlegungsschrift 2140834 do not exhibit any particularly good degree of proof against water-vapour diffusion through the composition.

BRIEF STATEMENT OF THE INVENTION

It is one of the various objects of the present invention to provide an improved hot-melt adhesive.

We have now found that a hot-melt adhesive composition comprising butyl rubber, thermoplastic block copolymer in certain selected proportions, tackifying resins and fillers, can be processed in one operation at relatively low processing-temperatures in the range of from 100° C. to 120°., and can be used to produce insulating glazing units bonded and sealed so that when the units are used in the usual working temperature-range for such units, they exhibit resistance to water-vapour diffusion, practically independently of temperature conditions.

The invention provides in one of its aspects a hot melt sealant of the present invention is an intimate mixture of butyl-rubber tackifying resin, finely divided filler, and sufficient of a styrene/butadiene/styrene block polymer or of a styrene/isoprene/styrene block copolymer to provide 0.5 to 10% by weight copolymer in the sealant.

DRAWING

The FIGURE is a graph showing the viscosities of hot melt sealing compositions as a function of the temperature.

DETAILED DESCRIPTION

In the butyl-rubber base mass, the hot-melt sealant contains tackifying resins and fillers. Other modifying materials, including polymers, may also be included. The sealant may contain some 20 to 40% by weight of finely-divided filler or some 25 to some 45% by weight of tackifying resins so long as a significant proportion of butyl rubber (for example more than about 30% by weight) is present. Suitably, for 100 parts by weight butyl rubber, there may be used 75 to 125 parts by weight tackifying resin, and 60 to 125 parts by weight finely divided filler. Preferably the ratio by weight of butyl rubber to tackifying resin to filler is of the order of 34 to 35 to 31.

Tackifying resins which may be used in a sealant according to the invention include terpene resins, terpene-phenolic resins, cyclic ketone resins, rosin, dehydrogenated rosin, glycerol esters of hydrogenated rosin, pentaerythritol esters of hydrogenated rosin, dydrogenated rosin, glycerol esters of polymerized rosin, maleic anhydride modified rosin and rosin derivatives, partial esters of styrene/maleic acid copolymers, oil soluble phenol aldehyde resins, coumaroneindene resins, petroleum hydrocarbon resins, metal salts of rosin and polymerized rosin, and polymerized mixed olefin resins.

Fillers which may be used in a sealant according to the invention include calcium carbonate, chalk, whiting, clay, silica, alkaline silicates, barytes, zinc oxide, magnesium oxide, asbestos, titanium dioxide and carbon black.

The preferred thermoplastic block copolymers are of the general formula $A(B-A)_n$ in which $n$ is an integer from 1 to 10, to block A is polystyrene, and the block B is either polybutadiene or polyisoprene; the polybutadiene or polyisoprene block may have an average molecular weight of 25,000 to 1,000,000 preferably from 35,000 to 150,000, and a polystyrene block may have an average molecular weight of 200 to 125,000, preferably from 8,000 to 45,000. Preferably $n$ is 1.

It is surprising that even the smallest additions of the block copolymer to the butyl mixtures, namely additions in the order of some 0.5 to 1.5%, are sufficient to impart to the composition an excellent workability as a hot melt at 120° C., without adversely affecting its other properties, especially the resistance to water-vapour diffusion and its adhesion. We believe that even small quantities of the block copolymers described are incompatible with butyl-rubber and that the cohesion of the butyl compound is thereby disturbed. Nevertheless, small quantities do not disturb the adhesion-properties of the butyl compound and its low water-vapour diffusion value. We also believe that it is precisely the cohesion-loss which elicits the surprising effect of improving the working properties of the butyl compound at high temperatures with a simultaneous diminution of the cold-flow.

According to a preferred embodiment of the invention, the hot-melt sealant contains 1.5 to 7.5% by weight, especially 1.5 to 3% by weight of the thermoplastic block copolymer.

Hot melt sealants according to the invention can be used for the production of laminated glazing units by a method relatively analogous to that described in U.S. Pat. No. 3,759,771. Preferably hollow spacers are placed near the edge of a first, previously prepared and cleaned, glass pane. A second, previously prepared and cleaned glass pane is located on the spacers in required position, leaving a channel around the assembly defined by marginal portions of the panes and the spacers. The hot-melt sealant is applied to the channel in a single pass. One of the hollow spacers preferably contains a drying agent for the intermediate space between the panes. Preferably, the hot melt sealant is applied at a temperature of 80° C. to 140° C. The application is preferably effected by means of a heated melt-adhesive applicator. The surface of the sealant is smoothed down after its application, while the sealant is still shapeable. After the cooling-off, the insulating glazing unit so produced can be used immediately. The exposed surface of the sealant may be protected by foil or some other suitable means to prevent damage in transport or possible attack by chemicals.

The following example is given to aid in understanding the invention but it is to be understood that the invention is not restricted to the patent materials, proportions, procedures or other details of the example.

EXAMPLE

Four butyl rubber based compositions were prepared having the composition shown in Table One. Of these compositions, the second and third are illustrative of the present invention.

TABLE I

| Constituents | Example Compositions | | | |
|---|---|---|---|---|
| | 1 | 2 | 3 | 4 |
| Butyl-rubber | 34.00 | 34.00 | 34.00 | 34.00 |
| Aliphatic hydrocarbon resin & | 35.00 | 35.00 | 35.00 | 35.00 |

TABLE I-continued

| Constituents | Example Compositions | | | |
|---|---|---|---|---|
| | 1 | 2 | 3 | 4 |
| methylabietate as tackifier | | | | |
| Colloid silicic acid and carbon black in the proportion 3:1 | 31.00 | 31.00 | 31.00 | 31.00 |
| Styrene/Butadiene/ Styrene block copolymer | — | 1.80 | 7.50 | 34.00 |
| | Kg 100.000 | 101.80 | 107.50 | 134.00 |

The butyl rubber used is a non-discoloring type with molecular weight of from about 100,000 and a non-saturation value of 1.6 mol %.

The styrene-butadiene-styrene block copolymer used has an S.G. of 0.94 and consists of two polystyrene blocks of number average molecular weight about 18,900 and a glass transition temperature of 50°C., and a polybutadiene block having a average molecular weight about 102,000 and a glass transition temperature of −79° C. The proportion of polystyrene to polybutadiene is 27 : 73 by weight.

The graph forming the Figure shows viscosities of the four compositions as a function of the temperature, the viscosities being determined in the course of softening the composition by measurements with a Wallace Curometer.

The curves shown in the Figure demonstrate that Composition 1, the pure butyl-rubber mixture without addition of any block copolymer according to the invention, shows no marked departure from a linear decrease in viscosity with increase in temperature. That is, the mixture shows a progressive softening beginning at a temperature as low as about 45° C.

In strong contrast thereto, the curve obtained for Composition 2 does not show an obvious softening or very marked decrease of viscosity until about 85° C, but then softens comparatively quickly until, at 120° C, a value of 8 Curometer units is reached.

The curves for Compositions 3 and 4 show that further increases in the quantity of block polymer present leads to no improvement in principle as compared with Composition 2. It shows more particularly that the initiation of softening with inclusion of greater quantities of block copolymer is again displaced to lower temperatures, whilst the course of the curves indicates a progressive return to the character of a softening rather than that of a melt.

Composition 2 does not begin to soften to an extent that is perceptible in practice until some 90° C., so an insulating glazing unit sealed and bonded with this mixture can be reliably inserted under stable conditions up to this temperature. On the other hand, however, Composition 2 can be processed even at a temperature of 120° C, as any other single-component hot-melt adhesive, in a simple manner and in a single working operation.

The water-vapour penetrability, measured according to DIN 53122 on the Compositions 1 to 4, is set out in the following Table II (the water-vapour penetrability is indicated in DIN 53122 by the quantity by weight of water-vapour that diffuses in 24 hours with an established air-moisture fall and at a specified temperature, through a square metre of the product tested; unit $g/m^2$):

TABLE II

| Example Composition | Water-vapour penetration (g/m²d) |
| --- | --- |
| 1 | 0.10 |
| 2 | 0.12 |
| 3 | 0.40 |
| 4 | 0.70 |

It can be seen from the data set forth in Table II that by the addition of up to some 2% by weight of block copolymer to the butyl-rubber composition (Composition 2), the latter's water-vapour penetrability effectively is not changed. With additions of 7.5 % by weight (Composition 3), there actually occurs a traceable, but probably acceptable increase in the water-vapour penetrability. With an addition of 34% by weight of block copolymer (Composition 4), however, the water-vapour penetrability already amounts to seven times that of the pure butyl-rubber mixture.

A combined evaluation of the data given in Table II with the curves shown in the drawings, leads thus to the conclusion that the basic problem of the invention can be solved by butyl-rubber mixtures which contain thermoplastic block polymer to an extent of from about 0.5 to about 10%, preferably some 1.5 to 7.5% by weight, but especially in the range of some 1.5 to 3% by weight in the composition.

The desired effect, namely rendering the butyl-rubber compound meltable to a desired workable condition is not effectively secured with block copolymer additions of less than about 0.5% by weight and is preferably secured with an addition of 1.5% or more by weight. On the other hand amounts of the block copolymer above 7.5% by weight and especially above about 10% by weight of the composition lead to a diminished resistance to water-vapour diffusion and to unfavorable melt-behavior as compared with compositions containing smaller amounts. Between these two limit-situations, a range of contents of 1.5 to 3% by weight is arrived at as the optimum content of the preferred block copolymer in the butyl-rubber based composition. The amount to be chosen in any particular case, however, depends upon the kind of butyl-rubber mixture, the nature of block copolymer used, and the intended use of the compound.

Having thus described my invention what I claim as new and desire to secure by Letters Patent of the United States is:

1. A hot melt sealant consisting essentially of at least 30% by weight of butyl-rubber, from 25% to 45% by weight of tackifying resin, from 20% to 40% by weight of finely divided filler and sufficient of a styrene/butadiene/styrene block copolymer or of styrene/isoprene/styrene block copolymer to provide 0.5 to 10% by weight copolymer in the sealant.

2. A sealant according to claim 1 wherein the block copolymer consists of two polystyrene blocks A with an average molecular weight of 8,000 to 45,000, and a polybutadiene or polyisoprene block B with an average molecular weight of 35,000 to 150,000.

3. A sealant according to claim 2 containing 1.5 7.5% by weight of the thermoplastic block copolymer.

4. A sealant according to claim 3, containing 1.5 to 3% by weight of the thermoplastic block copolymer.

* * * * *

UNITED STATES PATENT OFFICE
CERTIFICATE OF CORRECTION

Patent No. 4,032,489          Dated June 28, 1977

Inventor(s) Hilmar Haverstreng

It is certified that error appears in the above-identified patent and that said Letters Patent are hereby corrected as shown below:

Column 6, line 29, after the figures "1.5" should read --- to ---.

Signed and Sealed this

Thirteenth Day of September 1977

[SEAL]

Attest:

RUTH C. MASON
*Attesting Officer*

LUTRELLE F. PARKER
*Acting Commissioner of Patents and Trademarks*